United States Patent [19]
Kanczarek

[11] Patent Number: 4,690,438
[45] Date of Patent: Sep. 1, 1987

[54] FLANGE CONNECTION

[75] Inventor: Thaddaeus-Anton Kanczarek, Spardorf, Fed. Rep. of Germany

[73] Assignee: Kraftwerk Union Aktiengesellschaft, Mülheim, Fed. Rep. of Germany

[21] Appl. No.: 810,317

[22] Filed: Dec. 17, 1985

[30] Foreign Application Priority Data

Dec. 17, 1984 [DE] Fed. Rep. of Germany ....... 3445975
Dec. 2, 1985 [DE] Fed. Rep. of Germany ....... 3542593

[51] Int. Cl.$^4$ ............................................. F16L 23/00
[52] U.S. Cl. .................................... 285/363; 285/910; 277/235 R
[58] Field of Search .................. 285/363, 368, 910; 277/235 R, 235 B, 227

[56] References Cited

U.S. PATENT DOCUMENTS

| | | | |
|---|---|---|---|
| 323,731 | 8/1885 | Phillips | 285/363 X |
| 2,513,178 | 6/1950 | Jackson | 285/363 |
| 3,467,398 | 9/1969 | Bernard | 277/235 X |
| 3,516,688 | 6/1970 | Gachot | 285/363 X |
| 3,820,830 | 6/1974 | Dryer | 285/336 |
| 3,905,090 | 9/1975 | Painter | 29/455 |
| 3,930,656 | 1/1976 | Jelinek | 277/180 |
| 4,155,561 | 5/1979 | Rudy et al. | 285/368 X |
| 4,192,520 | 3/1980 | Hasegawa | 277/235 B |

FOREIGN PATENT DOCUMENTS 2517789  6/1983  France .

Primary Examiner—Thomas F. Callaghan
Attorney, Agent, or Firm—Herbert L. Lerner; Laurence A. Greenberg

[57] ABSTRACT

A flange connection with a disc-shaped base body of incompressible material disposed between mutually facing planar sealing surfaces of flanges which are to be assembled and connected to one another, the base body being formed with a central bore having a diameter matching an inner diameter of the flanges and formed with at least one annular slot, comprising a compressible sealing insert formed of expanded graphite and received in the annular slot, the sealing insert, before assembly and connection of the flanges, being higher by an amount $\Delta h$ than the depth of the annular slot, $\Delta h$ being of such value and the annular slot being of such volume that when the sealing insert is compressed more than 100 N per mm$^2$, with the flange engaging the base body and utilizing the spring-back resilient properties of the sealing insert, the sealing insert after the flanges are assembled, is enclosed on all sides by defining surfaces of the circular slot and by means of the sealing surfaces of the flanges.

10 Claims, 7 Drawing Figures

FLANGE CONNECTION

The invention relates to a flange connection with a disc-shaped base body of incompressible material which is inserted between mutually facing planar sealing surfaces of flanges which are to be connected, the base body being formed with a central bore having a diameter matching an inner diameter of the flanges and formed with at least one annular slot into which a sealing insert of expanded graphite is inserted.

It has been known heretofore to bolt flanges together with a sealing soft-material insert disposed therebetween. In such flange arrangements, the interposed soft-material insert must absorb the total compressive force of the flanges which are the compressive force produced by the tightening the bolts as well as additional forces which are transmitted to the flange via the pipelines which are being flanged together. These additional forces can sometimes exceed the permissible area pressure of the soft material insert at one side. Such additional forces are constant in very rare cases, and may be variable over a period of time, such as, the forces generated by thermal expansion, for example. It is also possible that such additional forces stress the flange connection in bending and intensely compress the soft-material insert unilaterally. If the soft-material insert is compressed too much, however, a consequence thereof may be that it is no longer restored to its original shape when the compressive contact force is relaxed or relieved, and the flange connection becomes loose or unsealed.

In flange connections which are subjected to marked variations in the compressive contact force, it has been known heretofore to machine or turn annular slots for the soft-material insert into the sealing surfaces. The soft-material inserts are then of such dimensions that they protrude from the annular slots. In such flange arrangements, only limited compression of the soft-material insert is possible. Maximally possible compression of the soft-material insert is attained when the metallic sealing surfaces of the two flanges lie directly on top of one another. In order not to overcompress or destroy the soft-material insert, the volume of the soft-material insert and the volume capacity of the annular slots must be matched exactly with one another in such flanges. With correct matching of the volume of the soft-material insert and the volume capacity of the annular slots, the flanges can be pressed against one another so strongly that the sealing surfaces of the flanges lie directly against one another without causing the soft-material insert to be overly compressed and non-sealing. The flange connection is then rigid. With such a constructive solution to the problem it is disadvantageous, however, that the flanges are weakened by the annular slots. This must be taken into consideration by appropriate design of the flanges and results in significantly heavier and more expensive flanges.

From French Pat. No. 2 517 789, a flange connection has already become known wherein sealing inserts of expanded graphite are used and which is effective without grooves or slots being formed in the sealing surfaces of the mutually facing flanges. In this conventional flange connection, a base body is inserted between the flanges and is formed of two concentric rings. A sealing insert of expanded graphite is introduced between these concentric rings of the sealing body. The mutually facing inner surfaces of the two concentric rings of the base body are machined in the shape of V belts and are slightly bent-out at protruding edges thereof. Before the sealing insert is installed, it must therefore be placed in a form or mold and pressed. The expanded graphite is thus pressed into the recess between the two concentric rings, and the bent-up edges of these concentric rings are pressed flat. After the seal has been compressed and the two flanges have been assembled, the sealing lens of expanded graphite which protrudes a distance "h" on both sides of the base body takes over the sealing of the flange connection. Such a flange connection can be employed successfully always where the pressure of the medium requires no heavier compression of the sealing insert than 100 newton per $mm^2$. Due to the relatively small radial sealing depth, i.e. the length of the leakage path for the medium, the range of application of such seals is limited, with the given, yet permissible surface contact pressure, to low to medium pressures of the medium. During application or insertion, for higher pressures and correspondingly heavier compressive contact of the two flanges at the seal, a sudden sliding off of the individual molecular grid planes of the graphite can occur during operation and can thereby cause destruction of the graphite insert structure, with the consequence of a sudden failure of the seal.

The reason for this is the property of the graphite that the surface contact pressure cannot be made arbitrarily high, but rather attains a value within the range of about 100 to 200 newton per $mm^2$, depending upon the starting thickness of the graphite, at which the carbon grid planes of the graphite begin to slide on one another. This leads to the situation wherein graphite seals begin to flow off laterally when this maximally permissible surface contact pressure is exceeded. This can lead to a sudden failure of the built-in flat seals.

It is accordingly an object of the invention to provide a flange connection which is suitable for high-pressure range and with which there is no danger of sudden failure of a sealing insert formed of expanded graphite.

With the foregoing and other objects in view, there is provided, in accordance with the invention, a flange connection with a disc-shaped base body of incompressible material disposed between mutually facing planar sealing surfaces of flanges which are to be assembled and connected to one another, the base body being formed with a central bore having a diameter matching an inner diameter of the flanges and formed with at least one annular slot, including a compressible sealing insert formed of expanded graphite and received in the annular slot, the sealing insert, before assembly and connection of the flanges, being higher by an amount $\Delta h$ than the depth of the annular slot, $\Delta h$ being of such value and the annular slot being of such volume that when the sealing insert is compressed more than 100 N per $mm^2$, with the flange engaging the base body and utilizing the spring-back resilient properties of the sealing insert, the sealing insert after the flanges are assembled, is enclosed on all sides by defining surfaces of the circular slot and by means of the sealing surfaces of the flanges.

In accordance with another feature of the invention, the base body is divided by at least one continuous annular slot into at least two concentric rings.

In accordance with a further feature of the invention, the annular slot has a radial extension defined as $R_a - R_i$ larger than $0.5 \times$ the difference between $R_a$ and $R_i$ in vicinity of contact surfaces thereof with the flanges.

In accordance with an additional feature of the invention, the annular slot has a radial extension defined as $R_a - R_i$ larger than twice the height of the base body.

In accordance with an added feature of the invention, the height $\Delta h$ by which the sealing insert of expanded graphite, which is completely inserted into the annular slot, projects altogether above the base body is of such value that the tightness of the insert after the assembly of the two flanges is above 1.7 to 2.35 kg per dm$^3$ with reference to the graphite material.

In accordance with yet another feature of the invention, the annular slot is formed in the interior of a planar recess formed in the base body.

In accordance with yet another feature of the invention, annular slots are formed in the base body and have a substantially rectangular cross section.

In accordance with yet a further feature of the invention, the annular slot has an axis of symmetry disposed at an inclination to an axis of symmetry of the base body.

In accordance with yet an additional feature of the invention, on opposite sides of the base body, annular slots are disposed directly adjacent one another with respective slot cross sections thereof being inclined in the same direction and having the same amount of inclination.

In accordance with yet an added feature of the invention, concentric annular slots are formed in the base body and have symmetry axes of the cross sections thereof, the symmetry axes extending in opposite directions on the same side of the base body.

In accordance with an alternate feature of the invention, the base body is formed of metal.

In accordance with a further aspect of the invention, the base body is formed of ceramic.

In accordance with still another feature of the invention, the base body is formed of carbon.

In accordance with still a further feature of the invention, the base body has a surface surrounding the planar recess which is so large that it can absorb a maximum mutual compressive force of the flanges without damage to the sealing surfaces of the flanges.

In accordance with still an additional feature of the invention, the surface of the base body surrounding the planar recess is covered with a soft material.

In accordance with still yet a further feature of the invention, the surface of the base body surrounding the planar recess is coated with silver.

In accordance with still a further aspect of the invention, the surface of the base body surrounding the planar recess is coated with copper.

In accordance with a concomitant feature of the invention, the annular slots are formed in the interior of planar recesses formed in the base body, the planar recesses having a funnel-shaped outline.

Due to the complete encapsulation or enclosure of the insert, on the one hand, and the appropriate choice of the amount $\Delta h$, by which the insert, prior to the assembly, is higher than the depth of the annular slot into which it is inserted, a compression of the graphite insert can be produced, during the assembly of the flanges, in which the surface contact pressure is increased far beyond 100 to 200 newton per mm$^2$. While graphite grid planes could indeed slide on one another with this surface contact pressure, they nevertheless remain captive due to the complete encapsulation or enclosure. Because the graphite particles can no longer be forced out laterally from the flange, a failure of the seal is thereby precluded, in spite of the high surface contact pressure. This, however, requires very narrow manufacturing tolerances for the metal support ring. The high surface contact pressure, in turn, makes the graphite insert impervious to the operating medium due to molecular meshing, and permits use with correspondingly highly compressed media.

The utilization of continuous annular or ring slots with the consequence of subdividing the base body into several concentric rings leads not only to a cost reduction in the manufacture of the base body when compared to the cost for a base body into which slots must be machined, but also to the greatest possible height of the sealing insert for a given base body height. The latter again leads to a maximizing both of the tolerance range for the height of the sealing insert as well as of the spring-back distance of the sealing insert. The increase of the spring-back path, however, again reduces the danger of non-sealing when bending stress is applied to the flange connection.

With the radial extension of the ring or annular slot into ranges larger than 0.5 of the difference between the inner and outer diameters of the flanges, the high sealing force of the overcompressed insert formed of expanded graphite is maintained over a relatively long radial leakage or creepage path. In this construction, which presupposes dispensing with a plurality of concentric sealing inserts, the sealing force is maximized.

Other features which are considered as characteristic for the invention are set forth in the appended claims.

Although the invention is illustrated and described herein as embodied in a flange connection, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
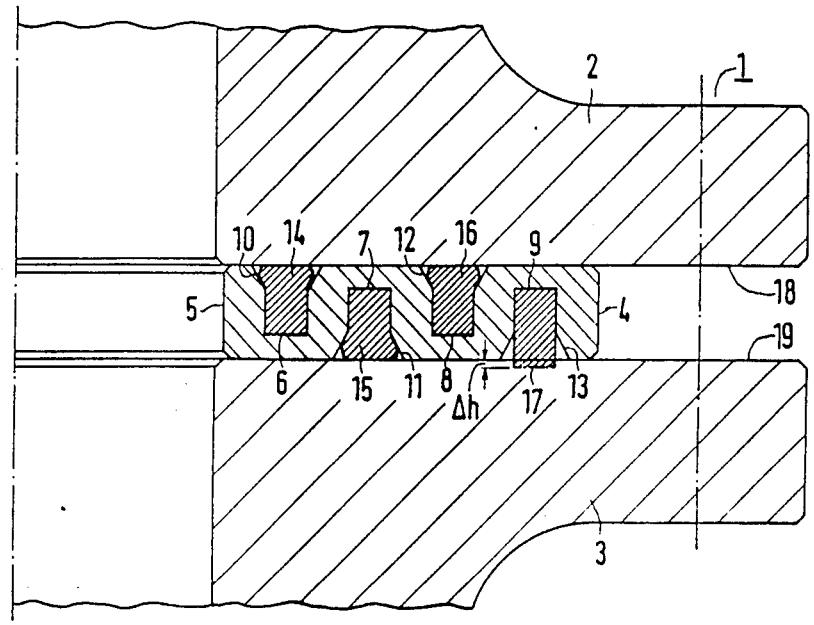
FIG. 1 is a cross-sectional view of a flange arrangement with an interposed base body according to the invention, which is formed with four concentric soft-material inserts.

Referring now to the drawing and, first, particularly to FIG. 1 thereof, there is shown a marginal zone of a flange connection 1, in which a disc-shaped base body 4 of the same material as that of flanges 2 and 3 is inserted between the two flanges 2 and 3 which are formed of steel in the illustrated embodiment. This thus incompressible base body 4 is provided with a central bore hole 5 which matches the inner diameter of the flanges 2 and 3 and carries alternatingly on opposite sides a total of four concentric annular slots 6, 7, 8 and 9. The annular slots are each located in a flat V-shaped depression or recess 10, 11, 12, 13. Into each of these annular slots 6, 7, 8, 9, a soft-material insert 14, 15, 16, 17 is inserted. FIG. 1 shows the inner soft-material inserts 14, 15, 16 in the form which they assume when the flanges are clamped together firmly. The outer soft-material insert 17, on the other hand, is shown with the contours which it had prior to bolting the flanges 2 and 3 together. From this drawing of an embodiment of the invention, it is seen that the soft-material inserts are compressed when the flanges 2 and 3 are pressed together and outstanding material is pressed into the flat depressions or recesses 10, 11, 12 and 13 laterally of the annular or ring slots 6, 7, 8 and 9.

A particular advantage of this flange arrangement 1 according to the invention is that commercially available flanges 2 and 3 without annular or ring slots can be used therein. Any weakening of the flanges by machining annular slots into them is avoided. Before the two flanges 2 and 3 are bolted together, only soft-material inserts 14, 15, 16 and 17 which are matched to the annular or ring slots formed in the base body 4 must be inserted. The soft-material inserts are provided with a cross section of such dimension that each insert fills a respective annular or ring slot entirely and, in addition, protrudes by an amount Δh beyond the surface of the base body. The value of Δh is chosen dependent upon the elastic properties of the soft-material insert so that the volume of the respective soft-material insert protrudes beyond the surface of the base body into which the respective annular slot is machined is pressable elastically into the respective annular slot when both flanges 1 and 3 are bolted together until the sealing surfaces 18 and 19 of the two flanges contact the base body directly. Greater compression and overpressing of the soft-material inserts 14, 15, 16 and 17 is not possible because all excessive forces are absorbed by the base body 4 so that no relative motion of the two flanges 2 and 3 disposed opposite one another can occur. The conical depression or recess 10 to 13 only has the purpose of preventing laterally displaced material of the soft-material insert from slipping into the vicinity of the non-depressed or non-recessed surface of the base body and preventing direct contact between the base body and the sealing surfaces 18 and 19 of the flanges.

Figure 2:
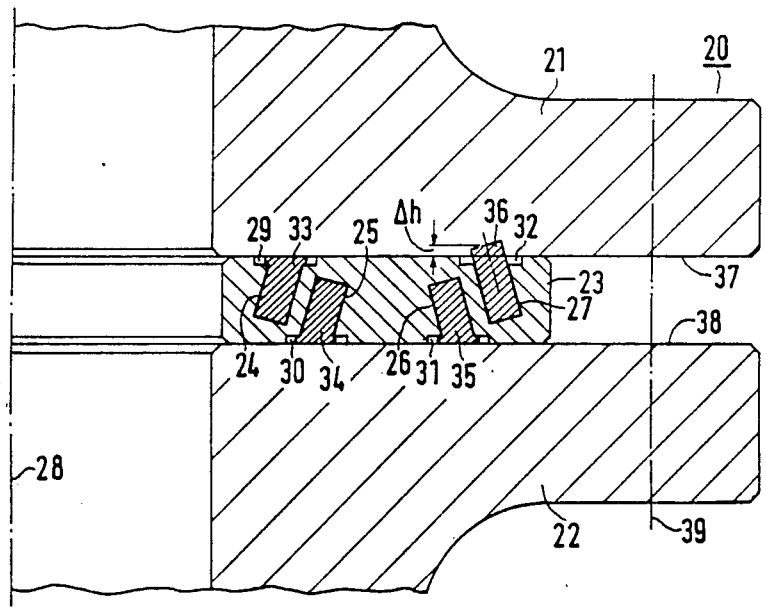
FIG. 2 is a view similar to that of FIG. 1 of another flange arrangement in which the base body is formed with inclined annular or ring slots for the soft-material insert.

FIG. 2 shows a somewhat different embodiment of the flange connection 20 wherein in the incompressible base body 23 pressed-in between the two flanges 21 and 22, respective pairs of annular or ring slots 24, 25, 26, 27 are machined, the cross section of which is aligned pairwise at an angle α obliquely to an axis of symmetry 28 of the base body 23. In this case, too, each annular or circular slot 24, 25, 26, 27 again lies in a shallow depression or recess 29, 30, 31, 32, and the soft-material insert 33, 34, 35, 36 projects by the amount Δh beyond the non-depressed surface of the base body 23 before the two flanges 21 and 22 are bolted together.

The soft-material inserts 33, 34, 35 and 36 and the incompressible base body 23 of FIG. 2 are handled in the same manner as was described in connection with the embodiment of FIG. 1. Three objectives are met by setting the annular or circular slots 24, 25, 26 and 27 at an inclined position in the base body 23. For one thing, the soft-material inserts 33, 34, 35 and 36 can no longer fall out during assembly due to their form-locking mounting in the annular or circular slots 24, 25, 26 and 27. Secondly, the effective volume of the soft material can be increased somewhat for a given thickness of the base body. This applied particularly if the bottom of the machined-in annular or circular slot deviates from the particular embodiment shown in FIG. 2 and is aligned parallel to the sealing surface of the flanges. Finally, the pressure points of the soft-material inserts 33, 34, 35 and 36 move closer together on both sides of the base body 23. As a result, the shear forces exerted on the two flanges 21 and 22 by the bolt or screw forces engaging at the pitch circle diameter 39 become larger. Thereby, the technically sensible maximum inclined position is limited to angles under 30 degrees and, in part, also under 20 degrees, depending upon the type of material forming the soft-material insert.

Figure 3:
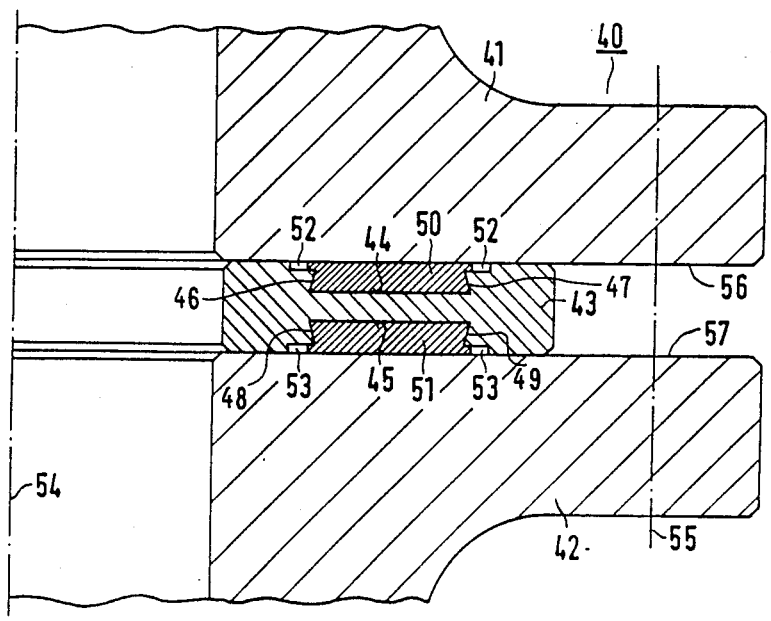
FIG. 3 is a view similar to that of FIG. 2 of a further flange arrangement in which the base body is formed with two opposite annular or ring slots.

The embodiment of FIG. 3 is a further flange arrangement 40 wherein a base body 43 clamped between two flanges 41 and 42 carries, on both sides thereof, only a respective single annular or circular slot 44, 45. These two annular or circular slots have the same radius. Lateral legs 46, 47, 48 and 49 of the two annular or circular slots are slightly undercut, i.e. the annular or circular slots are somewhat wider at the bottom than at the surface of the base body 43. The inserted soft-material inserts 50 and 51 are shown in the annular or circular slots. Again in this embodiment, the circular or annular slots are located in the region of a respective shallow annular depression or recess 52, 53 formed in the base body 43.

The axis of symmetry 54 of the flange arrangement 40 and the pitch circle diameter 55 for the bolt connections are indicated for the sake of orientation.

Also in this flange arrangement 40, the soft-material inserts 50 and 51 which, for example, are formed of expanded graphite, protrude by an amount Δh beyond the non-depressed or non-recessed surface portion of the base body 43 before the two flanges 41 and 42 are bolted together. This amount Δh must be chosen to be smaller in this case than the slot depth which is smaller than in the embodiment of FIG. 1 in order to produce the same elastic springiness of the soft-material insert. Moreover, whatever had been described in this connection with reference to the embodiment of FIG. 1 applies as well hereto. Because of the slight undercut of the annular or circular slots 44 and 45, the soft-material inserts also remain suspended therein form-lockingly the instant they are inserted into the base body 43. This facilitates the assembly. When the two flanges 41 and 42 are bolted together, the soft-material inserts are compressed elastically also in this case, and laterally forced-out material of the soft-material inserts is taken up or accommodated in the shallow depressions or recesses 52 and 53 so that this material cannot interfere with the direct contact of the sealing surfaces 56 and 57 of the two flanges 41 and 42 with the base body 43. A rigid flange connection is thereby achieved also with this flange arrangement, and excessive pressing or compression of the correctly dimensioned soft-material inserts 50 and 51 is prevented.

Figure 4:
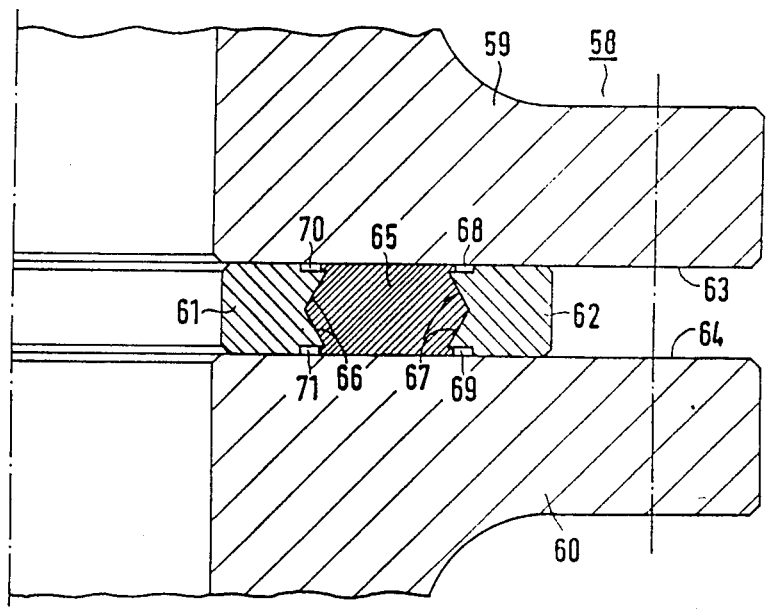
FIG. 4 is a view similar to that of FIG. 3 of yet another flange arrangement in which the opposing soft-material inserts are combined into a single soft-material insert.

FIG. 4 shows a flange arrangement 58 which is a modification of the flange arrangement 40 of the embodiment of FIG. 3. The base body clamped between the two flanges 59 and 60 is divided in FIG. 4 into two concentric base-body rings 61 and 62 by deepening the slots. Between them there is shown an inserted soft-material insert 65 which can be brought into contact on both sides thereof with the sealing surfaces 63 and 64 of the flanges 59 and 60. The surfaces 66 and 67 of the base-body rings 61 and 62 facing the soft-material insert 65 are machined so as to be slightly conical. Crowned or spherical machining thereof would likewise be possible. The rims of the base-body rings 61 and 62 facing the sealing surfaces 63 and 64 of the flanges 59 and 60 are formed with shallow depressions or recesses 68, 69, 70 and 71 at the side of the soft-material insert. Otherwise, the two flanges 59 and 60 correspond to the flanges in the embodiments of the other figures.

Because two concentric annular or ring-shaped base bodies 61 and 62 are used, machining expense and manufacturing cost are decreased in comparison with those for the embodiment in the other figures. Also, in this base body, the soft-material insert 65 which is pressed between the two concentric base-body rings 61 and 62 is held in a form-locking manner between the two concentric base-body rings and can be easily pressed by the latter between the flanges 59 and 60 which are to be bolted together. Due to the fact that only a single soft-material ring 65 is used which, at both opposite sides thereof, engages the sealing surfaces 63 and 64 of the two flanges 59 and 60, the greatest possible height of the soft-body insert can be attained for the same flange spacing, and the amount Δh by which the non-compressed soft-material insert 65 projects beyond the edge of the two concentric base-body rings 61 and 62, can be selected larger than is possible in the embodiment of FIG. 3. The permissible tolerances for the total height of the soft-material insert are thereby, however, greater than in the embodiment of FIG. 3.

Figure 5:
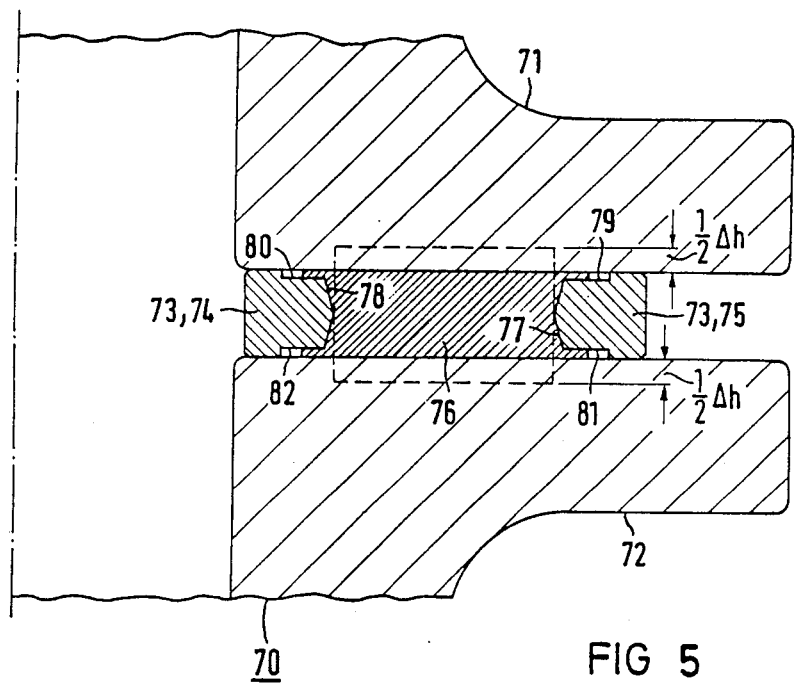
FIG. 5 is a sectional view of a marginal region of yet a further flange connection according to the invention.

FIG. 5 shows the rim or marginal region of another flange connection 70 according to the invention. Between the two flanges 71 and 72, a disc-shaped base body 78 of incompressible material is inserted, the material in this case being steel. In the embodiment of FIG. 5, this incompressible base body 78 is formed of two concentric rings 74 and 75. Between these two rings, a sealing material insert 76 of expanded graphite is inserted. Inner end faces 77 and 78 of the outer and inner rings 74 and 75 of the base body 78 which face one another are bevelled in the form of a gable roof. In addition, the two sides of the concentric rings facing the flange surfaces are provided with machined depressions or recesses 79, 80, 81 and 82 in the vicinity of the sealing-material insert 76. As is indicated in FIG. 1, the sealing material insert had the total added height indicated by the broken lines prior to the assembly of the flange connection. It was, accordingly, higher than the base body by the amount Δh.

During assembly, i.e. when the two flanges 71 and 72 were bolted together, the sealing-material insert 76 was compressed to the height of the base body 73. It was thus pressed in the marginal zone somewhat into the machined depression or recess 79, 80, 81, 82 of the two concentric rings 74 and 75.

Figure 6:
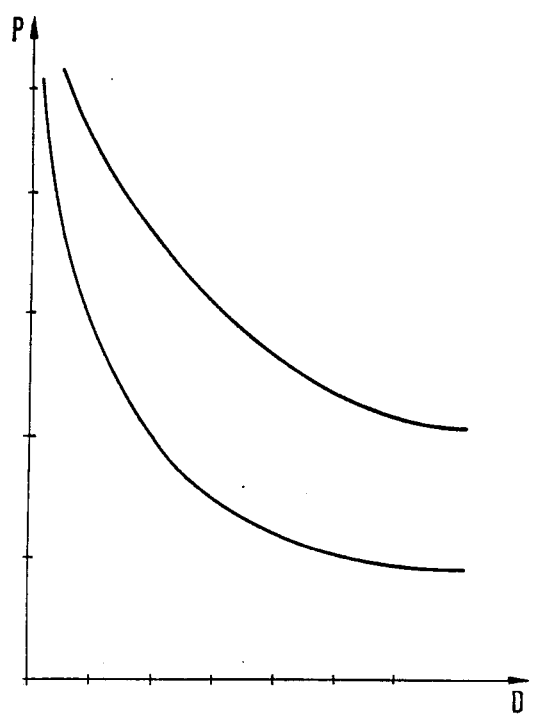
FIG. 6 is a plot diagram showing the dependence of the thickness of an insert formed of expanded graphite upon surface contact pressure during a first compression.

FIG. 6 shows the dependence of the thickness of a new insert of expanded graphite, which had not yet been previously compressed, on the pressure exerted on this insert. It is apparent therefrom that the surface contact pressure "P" increases exponentially with increasing compression of the expanded graphite insert, i.e. with increasing reduction of the thickness "D". In this diagram, there is also shown the maximum compression at which a pressure of 100 newton per mm$^2$ is reached and above which, heretofore, a sudden failure of the seal could be expected. The planar grid structure of the graphite is responsible for this sudden failure of seals of expanded graphite. The individual grid planes are held together substantially by Van der Waal's forces. If these adhesion forces are exceeded, the individual grid planes can slide off one another and the sealing insert can flow apart.

Figure 7:
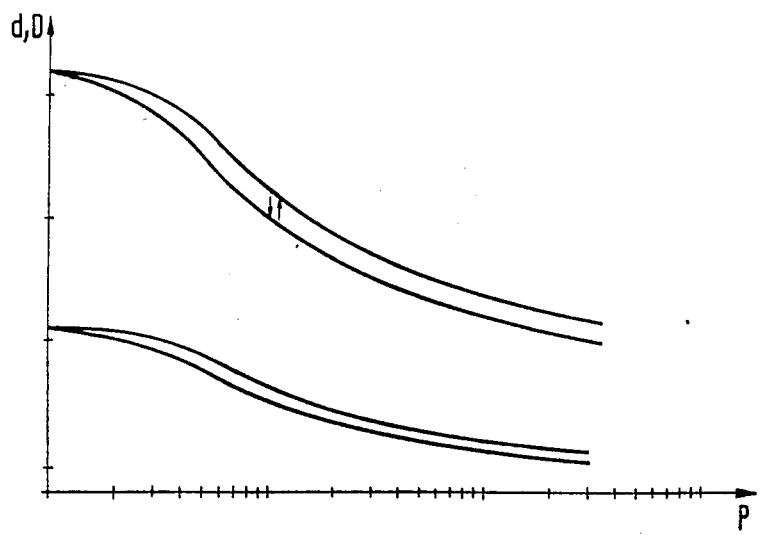
FIG. 7 is a plot diagram showing the spring-back of expanded graphite in dependence upon the initial pressure and the starting thickness of the insert.

FIG. 7 shows the spring-back "d" of the insert of expanded graphite as a function of the previously exerted maximum pressure "P". It is apparent from this diagram that the expanded graphite, after it has been compressed once, does not spring back to its starting thickness "D", but rather, that its spring-back "d" springs back, starting from the thickness "D" in the compressed condition, only a given percentage of the original starting thickness which is nearly independent of the exerted surface contact pressure. It becomes clear from this FIG. 7 what significance is ascribed to the starting thickness of the insert of expanded graphite for the spring-back property which is responsible for the tightness in the event of bending stresses of the flange connection. Because the starting thickness, however, depends upon the height of the base body as well as upon the compression to which the graphite insert is subjected during the assembly of the flange connection, the higher the pressure which is selected is, the more favorable the properties are which are obtained for a given base body height. It is thus a particular advantage of the construction according to the invention that, due to the complete compartmentalization of the graphite insert, it permits surface contact pressures which are far beyond 100 newton mm$^2$ which is normally not to be exceeded.

To obtain a tightness which is as great as possible, the base body is therefore built-up or composed of concentric rings in the flange connection according to the invention for maximizing the height of the inserts. The height of the graphite inserts is then selected at the initial installation thereof, so that it is subjected, to a surface contact pressure which is far greater than 100 newton per mm$^2$ during compression thereof to the height of the base body. Although, with these extremely high pressure values, forces are exerted on the graphite structure which are above the adhesion forces by which the individual stratified structures of the graphite adhere to one another, the graphite cannot, however, escape from the chamber formed between the outer and the inner ring of the base body and the two adjoining flange surfaces due to the steel surfaces of the flange and of the base body which are directly pressed against one another, when the flange connection is completely assembled. In this way, a failure of the seal is impossible in spite of this extremely high pressure. In addition, the nonpermeability of the graphite to every working medium is increased by this extreme surface contact pressure. To this must be added that due to the radial length of the contact surface of the sealing insert, long leakage or creepage paths are created at the flange, which can withstand extremely high medium pressures.

There is claimed:

1. A flange connection with a disc-shaped base body of incompressible material disposed between mutually facing planar sealing surfaces of flanges which are to be assembled and connected to one another, the base body being formed with a central bore having a diameter matching an inner diameter of the flanges and formed with at least one annular slot, comprising a compressible sealing insert formed of expanded graphite and received in the annular slot, said sealing insert, after the flanges are assembled, being enclosed on all sides by defining surfaces of the annular slot and by means of the sealing surfaces of the flanges in which said sealing insert, before assembly and connection of the flanges, is higher than the depth of the annular slot by an amount $\Delta h$, so that when said sealing insert is compressed, with the flange engaging the base body and taking into account the spring-back resilient properties of said sealing insert, said sealing insert has a compression of more than 100 N per mm$^2$.

2. Flange connection according to claim 1, wherein the height $\Delta h$ by which said sealing insert of expanded graphite, which is completely inserted into the annular slot, projects altogether above the base body is of such value that the tightness of the insert after the assembly of the two flanges is above 1.7 to 2.35 kg per dm$^3$ with reference to the graphite material.

3. Flange connection according to claim 1, wherein the annular slot has an axis of symmetry disposed at an inclination to an axis of symmetry of the base body.

4. Flange connection according to claim 3, wherein on opposite sides of the base body, annular slots are disposed directly adjacent one another with respective slot cross sections thereof being inclined in the same direction and having the same amount of inclination.

5. Flange connection according to claim 1, wherein concentric annular slots are formed in the base body and have symmetry axes of the cross sections thereof, said symmetry axes extending in opposite directions on the same side of the base body.

6. Flange connection according to claim 1, wherein the base body is formed of ceramic.

7. Flange connection according to claim 1, wherein the base body is formed of carbon.

8. Flange connection according to claim 1, wherein said surface of the base body surrounding said annular slot is covered with a soft material.

9. Flange connection according to claim 1, wherein said surface of the base body surrounding said annular slot is coated with silver.

10. Flange connection according to claim 1, wherein said surface of the base body surrounding said annular slot is coated with copper.

* * * * *